(12) United States Patent
Thompson, III

(10) Patent No.: US 7,388,538 B1
(45) Date of Patent: Jun. 17, 2008

(54) SYSTEM AND METHOD FOR OBTAINING ATTITUDE FROM KNOWN SOURCES OF ENERGY AND ANGLE MEASUREMENTS

(75) Inventor: Andrew A. Thompson, III, North East, MD (US)

(73) Assignee: Th United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/507,201

(22) Filed: Aug. 18, 2006

Related U.S. Application Data

(60) Provisional application No. 60/713,619, filed on Aug. 18, 2005.

(51) Int. Cl.
*G01S 5/02* (2006.01)
(52) U.S. Cl. .................................. 342/357.11
(58) Field of Classification Search ............ 342/357.01, 342/357.02, 357.06, 357.08, 357.11
See application file for complete search history.

(56) References Cited

U.S. PATENT DOCUMENTS

| | | | | |
|---|---|---|---|---|
| 5,189,424 | A * | 2/1993 | Brown | 342/25 C |
| 6,016,990 | A * | 1/2000 | Small | 244/3.11 |
| 6,163,021 | A * | 12/2000 | Mickelson | 244/3.2 |
| 7,196,653 | B2* | 3/2007 | Hall et al. | 342/25 F |
| 2005/0184192 | A1* | 8/2005 | Schneider | 244/3.1 |

OTHER PUBLICATIONS

Crassidis, J. et al., "A Novel Sensor for Attitude Determination Using Global Positioning System Signals," American Institute of Aeronautics and Astronautics, AIAA-98-4228, pp. 1-10, 1998.
Harkins, T. et al., "Magsonde: A Device for Making Angular Measurements on Spinning Projectiles With Magnetic Sensors," ARL-TR-2310, Dec. 2000, 29 pages.
Thompson, A. et al., "A-Point-wise Solution for the Magnetic Field Vector," ARL-TR-2633, Jan. 2002, 29 pages.
Wilson, M. et al., "Attitude Determination With Magnetometers for Gun-Launched Munitions," ARL-TR-3209, Aug. 2004, 23 pages.
Conley, J. et al, "An Attitude Determining System for Spinning Rockets," BRL-R-1291, Dec. 1965, 54 pages.

* cited by examiner

*Primary Examiner*—Dao L Phan
(74) *Attorney, Agent, or Firm*—Edward L. Stolarun; Richard A. Morgan

(57) ABSTRACT

A system and method of determining an orientation of a spinning object at a known GPS location comprises radially deploying antennae around a plurality of axes of measurement of the spinning object; determining a spin axis of a first end of the spinning object; measuring, using a frequency domain correlation, a roll angle corresponding to the spin axis in relation to a first plane of the GPS location; repeating the measuring process for multiple planes of the GPS location; and generating the orientation of the spinning object by combining all roll angle measurements. The method further comprises determining a sensing vector orthogonal to the spin axis; identifying at least two known GPS locations corresponding to the spinning object; and rotating the sensing vector about the spin axis until two of the known GPS locations become visible or are in the plane of the sensing vector and the spin axis.

9 Claims, 4 Drawing Sheets

SYSTEM AND METHOD FOR OBTAINING ATTITUDE FROM KNOWN SOURCES OF ENERGY AND ANGLE MEASUREMENTS

CROSS REFERENCE TO RELATED APPLICATION

This application claims the benefit of U.S. Provisional Patent Application No. 60/713,619 filed on Aug. 18, 2005, the complete disclosure of which in its entirety is herein incorporated by reference.

GOVERNMENT INTEREST

The embodiments described herein may be manufactured, used, and/or licensed by or for the United States Government without the payments of royalties thereon.

BACKGROUND

1. Technical Field

The embodiments herein generally relate to navigation systems and methods, and, more particularly, to techniques for determining an orientation of an object.

2. Description of the Related Art

Coordinate adjustment is used within global positioning system (GPS) receivers to process pseudorange measurements. Coordinate adjustment is central to the precise estimation of location. Surveying and geodesy both have contributed to this body of literature. Attitude estimation is a problem in many fields from detecting small shifts in snow to predicting avalanches to aerospace applications. Many systems sole purpose is to estimate the attitude of an object. Methods for attitude determination include combining the sightline vectors of a discovered GPS object together with the fixed boresight vectors of the individual antenna elements of the object. Additionally, other methods are described in Crassidis, J. et al., "A Novel Sensor for Attitude Determination Using Global Positioning System Signals," American Institute of Aeronautics and Astronautics, AIAA-98-4228, pp. 1-10, 1998, the complete disclosure of which, in its entirety, is herein incorporated by reference. However, notwithstanding the conventional techniques, there remains a need for a new technique for determining an attitude of an object.

SUMMARY

In view of the foregoing, the embodiments herein provide a method of determining an orientation of a spinning object at a known GPS location and a program storage device readable by computer, tangibly embodying a program of instructions executable by the computer to perform the method of determining an orientation of a spinning object at a known GPS location, wherein the method comprises radially deploying antennae around a plurality of axes of measurement of the spinning object; determining a spin axis of a first end of the spinning object; measuring a roll angle corresponding to the spin axis in relation to a first plane of the GPS location; repeating the measuring process for multiple planes of the GPS location; and generating the orientation of the spinning object by combining all roll angle measurements.

Preferably, the measuring process occurs using a frequency domain correlation. The method may further comprise determining a sensing vector orthogonal to the spin axis; identifying at least two known GPS locations corresponding to the spinning object; and rotating the sensing vector about the spin axis until two of the known GPS locations become visible or are in the plane of the sensing vector and the spin axis, wherein a first point of rotation of the sensing vector exists when a first known GPS location becomes visible or is in the plane of the sensing vector and the spin axis, and wherein a second point of rotation of the sensing vector exists when a second known GPS location becomes visible or is in the plane of the sensing vector and the spin axis. Also, the method may further comprise calculating a rotational distance between the first point of rotation of the sensing vector and the second point of rotation of the sensing vector. Additionally, the method may further comprise calculating the roll angle corresponding to the spinning object by normalizing the sensing vector at the first point of rotation of the sensing vector and the second point of rotation of the sensing vector. Preferably, the method further comprises corresponding energy sources to the known GPS location.

Another embodiment herein provides a system for determining an orientation of a spinning object at a known GPS location, wherein the system comprises antennae radially deployed around a plurality of axes of measurement of the spinning object; a transceiver on the spinning object and adapted to transmit wireless signals from the spinning object; a receiver adapted to receive the transmitted wireless signals from the transceiver; and a logic component in communication with the receiver and adapted to determine a spin axis of a first end of the spinning object; measure a roll angle corresponding to the spin axis in relation to a first plane of the GPS location; repeat measurements of roll angles for multiple planes of the GPS location; and generate the orientation of the spinning object by combining all roll angle measurements.

Preferably, the measurement of the roll angles occurs using a frequency domain correlation. Moreover, the logic component is preferably adapted to determine a sensing vector orthogonal to the spin axis; identify at least two known GPS locations corresponding to the spinning object; and rotate the sensing vector about the spin axis until two of the known GPS locations become visible or are in the plane of the sensing vector and the spin axis, wherein a first point of rotation of the sensing vector exists when a first known GPS location becomes visible or is in the plane of the sensing vector and the spin axis, and wherein a second point of rotation of the sensing vector exists when a second known GPS location becomes visible or is in the plane of the sensing vector and the spin axis. Furthermore, the logic component may be adapted to calculate a rotational distance between the first point of rotation of the sensing vector and the second point of rotation of the sensing vector; and calculate the roll angle corresponding to the spinning object by normalizing the sensing vector at the first point of rotation of the sensing vector and the second point of rotation of the sensing vector. Preferably, the known GPS location corresponds with energy sources directed towards the spinning object.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
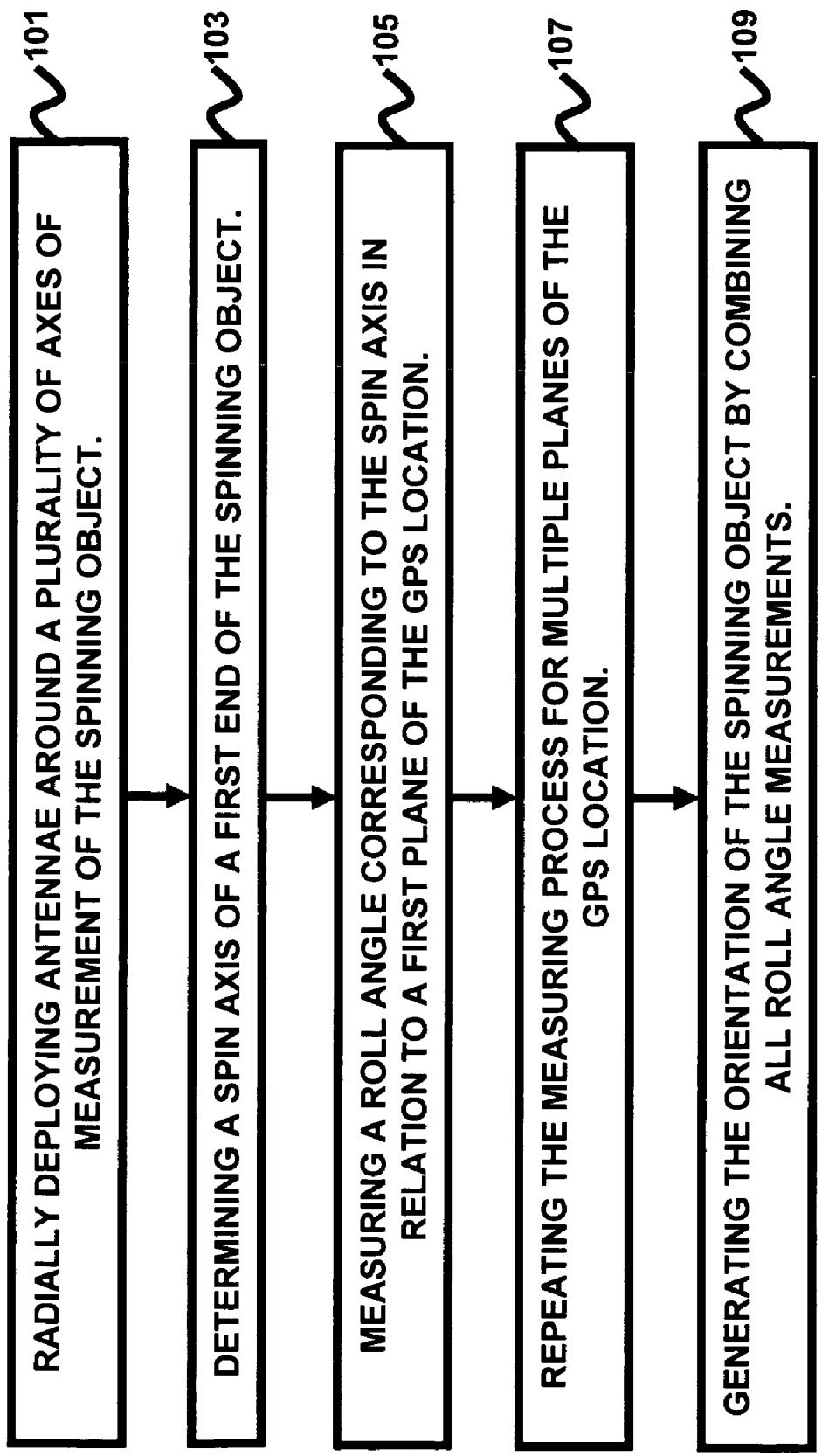
FIG. 1 is a flow diagram illustrating a preferred method according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a new technique for determining an attitude of an object. The embodiments herein achieve this by providing a technique for determining the attitude of an object at a known GPS location by using radially deployed antennae around the axes of the object and then using a frequency domain correlation to measure the roll angle on that axis antennae to a GPS satellite plane. Making multiple correlations to multiple satellite planes provides all attitude parameters. Referring now to the drawings, and more particularly to FIGS. 1 through 4, where similar reference characters denote corresponding features consistently throughout the figures, there are shown preferred embodiments.

FIG. 1 is a flow diagram illustrating a method of determining an orientation of a spinning object at a known GPS location according to an embodiment herein. The method comprises radially (101) deploying antennae around a plurality of axes of measurement of the spinning object; determining (103) a spin axis of a first end of the spinning object; measuring (105) a roll.angle corresponding to the spin axis in relation to a first plane of the GPS location; repeating (107) the measuring process for multiple planes of the GPS location; and generating (109) the orientation of the spinning object by combining all roll angle measurements.

Preferably, the measuring process (105) occurs using a frequency domain correlation. The method may further comprise determining a sensing vector orthogonal to the spin axis; identifying at least two known GPS locations corresponding to the spinning object; and rotating the sensing vector about the spin axis until two of the known GPS locations become visible or are in the plane of the sensing vector and the spin axis, wherein a first point of rotation of the sensing vector exists when a first known GPS location becomes visible or is in the plane of the sensing vector and the spin axis, and wherein a second point of rotation of the sensing vector exists when a second known GPS location becomes visible or is in the plane of the sensing vector and the spin axis. Also, the method may further comprise calculating a rotational distance between the first point of rotation of the sensing vector and the second point of rotation of the sensing vector. Additionally, the method may further comprise calculating the roll angle corresponding to the spinning object by normalizing the sensing vector at the first point of rotation of the sensing vector and the second point of rotation of the sensing vector. Preferably, the method further comprises corresponding energy sources to the known GPS location.

Generally, the embodiments herein provide a technique that determines the attitude of a spin axis from rotational measurements between known locations, which enhances the capabilities of a GPS receiver on a spinning body. With respect to coordinate estimation, angles, recast as inner product measurements, can be used within the umbrella of coordinate adjustment. Determining equations for the measurements in terms of the unknown location establishes the necessary function, wherein the gradient of each of these functions is used as a row in a least squares observation matrix. Using an iterative process the location can be estimated.

GPS receivers have advanced in complexity. Of particular interest is the new SiRF® III receiver, available from SiRF Technology, Inc., California, USA, which contains over 200,000 correlators. These correlators are used to search the frequency-time delay space and find the GPS signal associated with a given satellite. After satellite positions have been acquired many of these correlators are idle and thus present an unutilized resource. A spinning round will create a Doppler effect on the received GPS signal for a small area or spin axis oriented antenna. Spinning rounds typically use ring antennas to bypass this situation.

For example, a spinning round may use both a ring antenna and a patch or spin axis aligned antenna. The GPS receiver uses the ring antenna to acquire and track the GPS signals; thus the signal tracking information is available within the receiver. The patch antenna has a frequency shift associated with its received signal for its rotation cycle except when it is moving perpendicular to the satellite direction. By using the tracking information from the ring antenna and interrogating the patch antenna the point of alignment can be found.

The idle correlators can be used for this task with the GPS receiver determining the position of each satellite in a frequency time delay space using the ring or main antenna. A secondary antenna with a limited field of view will only have line of sight to the antenna over a portion of its rotational cycle; however, by using the time delay-frequency information from the main antenna it is possible to quickly detect a given satellite in the secondary antenna's signal. The number of correlators assigned to this task is determined based on the available idle correlators. There are many signal parameters that could be used; for example, time of first detection, the time the frequencies on the two antennas are the same, or the time of maximum signal strength, etc. The desired information is the angle or time between these readings for different satellites. Using this information and timing information, roll angles between satellites can be found as further described below in more detail. Through the use of three such measurements of roll angle it is possible, with knowledge of position and direction to each satellite, to find the orientation of the spin axis. Moreover, a directional antenna could be used removing the need for a Doppler shift. More specifically, the directional antenna uses the time of first observation as the important signal parameter.

The above description of the GPS receiver provides an example of a possible implementation of the method provided by the embodiments herein. Preferably, roll angles are determined between known directions corresponding to the spin axis of a rotating object. In order to visualize roll angles consider the half plane of FIG. 2 that is attached to a spin axis. As this plane rotates, points in the containing space enter and leave this plane; the roll angle between two points is the amount of roll between one point leaving this rotating plane and the other point entering the rotating plane.

Figure 2:
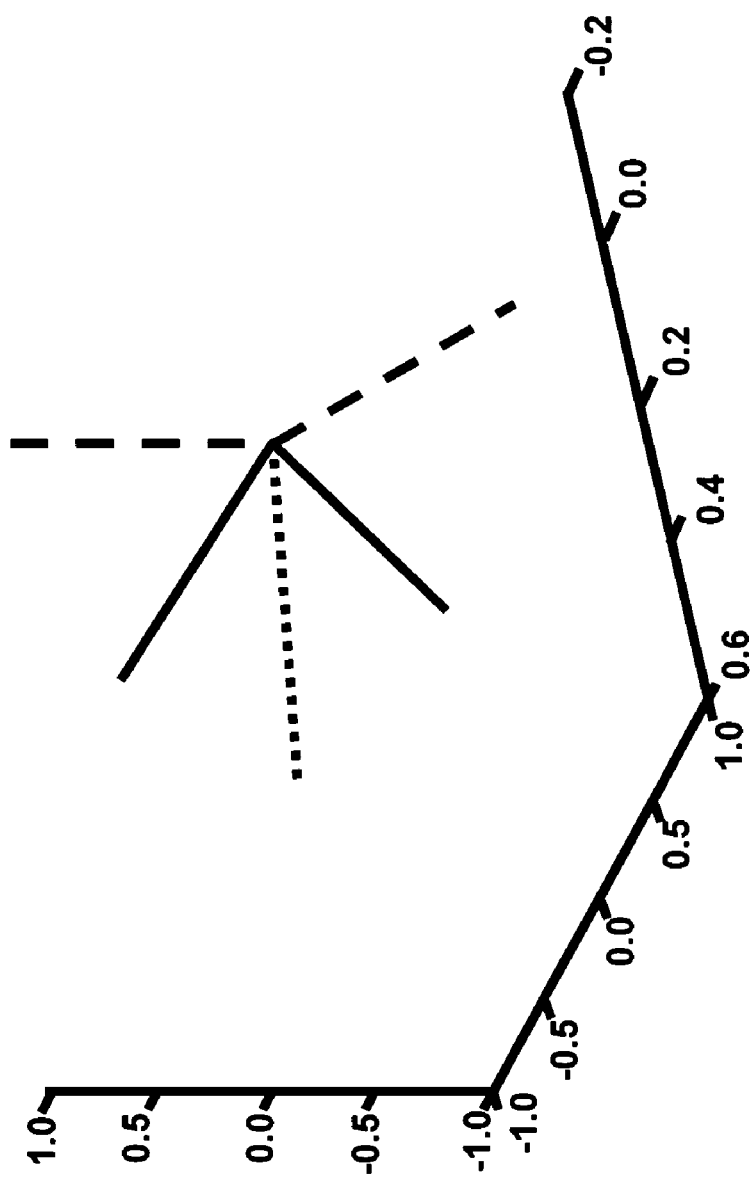
FIG. 2 is a graphical illustration representing a half plane corresponding to the spin axis of a rotating object according to an embodiment herein.

In FIG. 2 the dotted segment corresponds to the spin axis, the two full segments are the directions to known locations, and the two dashed segments are the components of the two directions orthogonal to the spin axis. The angle between the two dashed segments is the measured roll angle. The rotating half plane attached to the spin axis will contain one of these dashed segments and the corresponding full segment at the same instant of time; thus the angle between the two dashed segments is the roll angle between directions. Due to the geometry the constraints imposed by the roll angles are sufficient to define the orientation or attitude of the spin axis. To further illustrate this concept, the following situations are described.

Given two directions or vectors and the plane formed by them. If the spin axis vector is orthogonal to this plane, then the roll angle between the two directions is the same as the angle between the two directions. If the spin axis is in the same plane between the two directions, then the roll angle is 180 degrees. However, if the spin axis is located in the same plane so that both directions are to one side, the roll angle between the two directions is zero degrees as they are both in the same half plane. Three roll measurements define the attitude of the spin axis; thus four known directions are preferred in accordance with the embodiments herein. For GPS systems four satellites are generally always in view.

Next, nonlinear least squares are described within the context of the embodiments herein. Beginning with the equation:

$$FX=Y \qquad (1)$$

where X is the vector of unknown coordinates, Y represents measurements, and F is a matrix model of a known linear relationship. Then, both sides of Equation (1) are projected onto the column space of the matrix F. Next, each side of Equation (1) is multiplied by the transpose of F and then, assuming X is multiplied by a square matrix of full rank, each side of Equation (1) is multiplied by the inverse, whereby the result is:

$$X=(F^tF)^{-1}F^tY \qquad (2)$$

Both F and Y are known values while X represents the unknown parameters.

Next, suppose the functional relationship, $f$ between the measurements and the coordinates (X) is known. This function is typically nonlinear. To start, the value of X is approximated and is denoted as $X_0$. The gradient matrix for the measurements with respect to the coordinates is denoted by F. If $X_0$ is reasonably close to X, then the following linearized approximation is valid:

$$f(X)=f(X_0)+F_{X_0}(X-X_0) \qquad (3)$$

The left side of Equation (3) is the measurement vector while the first term on the right side of Equation (3) is the evaluation of the functional relationship at the point $X_0$. Moving this term to the left side allows the interpretation of the left side as the deviation of the measurements from the approximated coordinates. In other words, the function $f(X)$ can now be analyzed. The gradient evaluated at the point is multiplied by the unknown deviation from the approximation of the location. Equation (3) can be written in the form Y=FX as follows:

$$f(X)-f(X_0)=F_{X_0}(X-X_0) \qquad (4)$$

Linear least squares can be used to solve for the location deviation. After the solution is added to the current approximation (and becomes the new current approximation) the process can be repeated until the left side of Equation (4) approaches zero. Next, the realizations of $f$ and F for different measurements in terms of coordinates are described. Generally, within the F matrix different types of measurements can be used; however, only roll angles are considered. Each measurement defines a row of the matrix.

Next, with respect to roll angle measurements, first note that all the quantities are vectors on the unit sphere. Additionally, all directions are normalized. The unknown quantity is the vector representing the spin axis. The so-called Gram Schmidt process is a technique for setting up an orthogonal basis for a set of vectors. For two vectors one may use this approach to create two orthogonal vectors. Consider two known directions and a spin axis, the roll angle is the angle between the orthogonal components of the known directions to the spin angle. First, each of these vectors is described, and then their inner product will provide the angle between them. Let X be the unknown coordinates of the spin axis, and let $d_1$, $d_2$ be two known unit directions. The orthogonal or radial components of each direction are:

$$r_1=d_1-\langle d_1,x\rangle x \qquad (5)$$

$$r_2=d_2-\langle d_2,x\rangle x \qquad (6)$$

where the $\langle\ \rangle$ brackets indicate the inner product function. Assuming these new vectors are normalized using normalization factors $n_1$ and $n_2$, the inner product between these yields the cosine of the angle between them:

$$\cos(\theta) = \left\langle \frac{d_1 - \langle d_1, x\rangle x}{n_1}, \frac{d_2 - \langle d_2, x\rangle x}{n_2}\right\rangle = \left\langle \frac{d_1 - p_1 x}{n_1}, \frac{d_2 - p_2 x}{n_1}\right\rangle \qquad (7)$$

whereby the inner products are defined by $p_1$ and $p_2$. The additional subscript indicates the component of the represented quantity. This can be written out as:

$$= \frac{1}{n_1 n_2}((d_{11} - p_1 x_1)(d_{21} - p_2 x_1) + \qquad (8)$$
$$(d_{12} - p_1 x_2)(d_{22} - p_2 x_2) + (d_{13} - p_1 x_3)(d_{23} - p_2 x_3)).$$

Next Equation (8) is expanded and then rearranged into a more concise group of symbols. Temporarily ignoring the normalization factors, each of the terms is multiplied out as follows:

$$= d_{11}d_{21} - p_1 d_{21} x_1 - p_2 d_{11} x_1 + p_1 p_2 x_1^2 + d_{12}d_{22} - p_1 d_{22} x_2 - \qquad (9)$$
$$p_2 d_{12} x_2 + p_1 p_2 x_2^2 + d_{13}d_{23} - p_1 d_{23} x_3 - p_2 d_{13} x_3 + p_1 p_2 x_3^2$$

Now, the regrouping of terms results in:

$$= d_{11}d_{21} + d_{12}d_{22} + d_{13}d_{23} - p_1(d_{21}x_1 + d_{22}x_2 + d_{23}x_3) - \\ p_2(d_{11}x_1 + d_{12}x_2 + d_{13}x_3) + p_1p_2(x_1^2 + x_2^2 + x_3^2) \quad (10)$$

This result can be written in terms of inner products:

$$= \langle d_1, d_2 \rangle - p_1 \langle d_2, x \rangle - p_2 \langle d_1, x \rangle + p_1 p_2 \|x\|. \quad (11)$$

All of the original vectors including the sensor spin axis vector are considered to be normalized. Equation (12) can be recast as:

$$= \langle d_1, d_2 \rangle - p_1 p_2 - p_2 p_1 + p_1 p_2. \quad (13)$$

Reintroducing the normalization factor:

$$= \frac{\langle d_1, d_2 \rangle - p_1 p_2}{n_1 n_2} = \frac{\langle d_1, d_2 \rangle - \langle d_1, x \rangle \langle d_2, x \rangle}{n_1 n_1}. \quad (14)$$

Accordingly, the relationship between the cosine of the roll angle and the coordinates of the normalized spin axis is established. Using this functional relationship the gradient of the cosine of the roll angle with respect to the coordinates of the unknown spin axis can be determined. Next, an expression for the partial derivative with respect to the ith component of the spin axis is determined:

$$\frac{\partial \left( \frac{\langle d_1, d_2 \rangle - \langle d_1, x \rangle \langle d_2, x \rangle}{n_1 n_2} \right)}{\partial x_i} = -\frac{d_{1i}\langle d_2, x \rangle + d_{2i}\langle d_1, x \rangle}{n_1 n_2}. \quad (15)$$

This assumes the normalization factors make negligible contributions to the partial derivative. In some situations the extra complexity may be tolerated but, in general, the normalization factors can be treated as constants in the partial derivative. At this point it is possible to form a row in the previously described F matrix that corresponds to the cosine of the observed roll angle. To estimate the three coordinates of the spin axis, a minimum of three rows is used. By dealing directly with the cosine of the angle, the partial derivative is simplified in comparison to the partial derivative of the angle with respect to the coordinates. By doing this, the calculations are simplified considerably, which saves processing time (i.e., computer processing time and computer memory) when implemented in a real time application.

A Matlab® toolbox, available from The MathWorks, Massachusetts, USA, was designed to simulate the above and verify that the techniques provided by the embodiments herein produce accurate results. After completing this validation a known GPS toolbox is used to test the method provided by the embodiments herein under realistic conditions. In these simulations the orientation of the spin axis is determined. The Appendix provided below describes the computer code used in the simulation. The simulation indicates that the embodiments herein are operable using GPS satellites as known directions.

The embodiments herein provide a technique that estimates attitude from known directions and roll angle measurements wherein if these requirements are met, then accurate estimates of the axis orientation can be made. The embodiments herein may be utilized in a variety of applications including military and commercial use such as artillery systems. For systems already equipped with GPS for position information, the embodiments herein allow the receivers to be extended and also deliver attitude information by using the roll angles and knowledge of the location of the energy source to find the orientation of a body.

Figure 3:
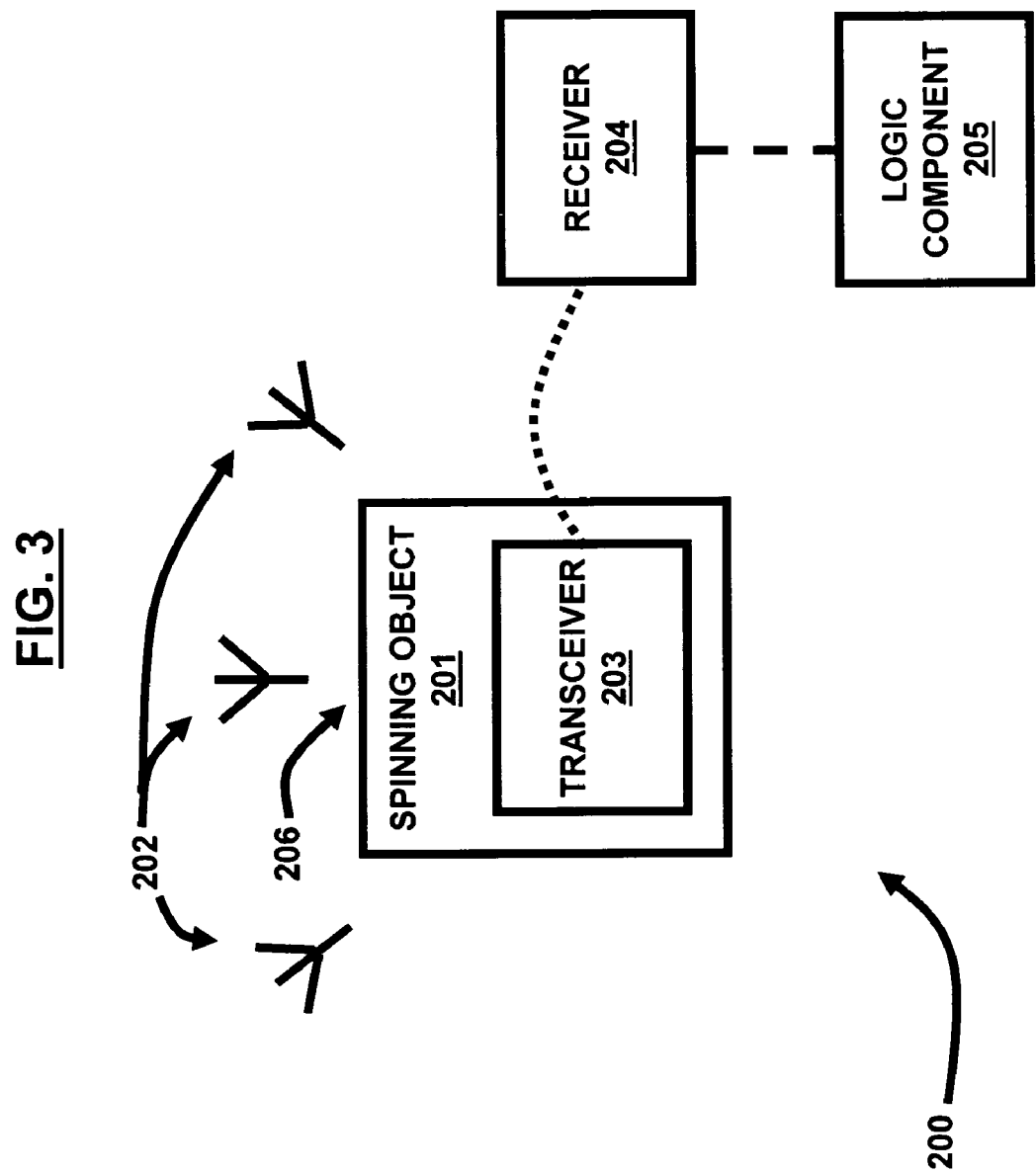
FIG. 3 is a schematic diagram illustrating a system according to an embodiment herein.

FIG. 3 illustrates a block diagram illustrating a system 200 for determining an orientation of a spinning object 201 at a known GPS location according to an embodiment herein, wherein the system 200 comprises antennae 202 radially deployed around a plurality of axes of measurement of the spinning object 201; a transceiver 203 on the spinning object 201 and adapted to transmit wireless signals from the spinning object 201; a receiver 204 adapted to receive the transmitted wireless signals from the transceiver 203; and a logic component 205 in communication with the receiver 204 and adapted to determine a spin axis of a first end 206 of the spinning object 201; measure a roll angle corresponding to the spin axis in relation to a first plane of the GPS location; repeat measurements of roll angles for multiple planes of the GPS location; and generate the orientation of the spinning object 201 by combining all roll angle measurements.

Preferably, the measurement of the roll angles occurs using a frequency domain correlation. Moreover, the logic component 205 is preferably adapted to determine a sensing vector orthogonal to the spin axis; identify at least two known GPS locations corresponding to the spinning object 201; and rotate the sensing vector about the spin axis until two of the known GPS locations become visible or are in the plane of the sensing vector and the spin axis, wherein a first point of rotation of the sensing vector exists when a first known GPS location becomes visible or is in the plane of the sensing vector and the spin axis, and wherein a second point of rotation of the sensing vector exists when a second known GPS location becomes visible or is in the plane of the sensing vector and the spin axis.

Furthermore, the logic component 205 may be adapted to calculate a rotational distance between the first point of rotation of the sensing vector and the second point of rotation of the sensing vector; and calculate the roll angle corresponding to the spinning object by normalizing the sensing vector at the first point of rotation of the sensing vector and the second point of rotation of the sensing vector. Preferably, the known GPS location corresponds with energy sources directed towards the spinning object.

The embodiments herein can take the form of an entirely hardware embodiment, an entirely software embodiment or an embodiment including both hardware and software elements. The software embodiment includes but is not limited to firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
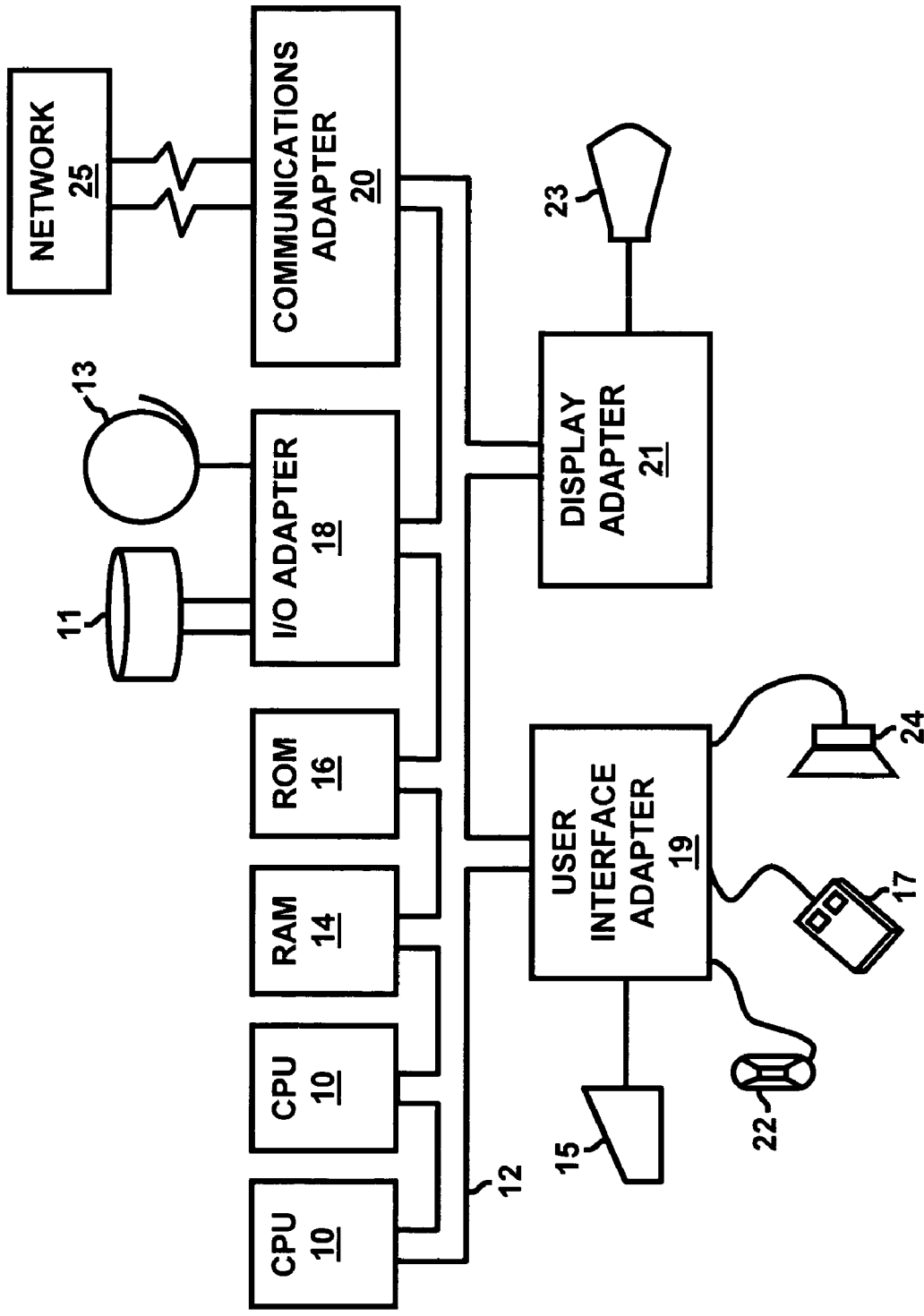
FIG. 4 is a schematic diagram illustrating a computer system according to an embodiment herein.

A representative hardware environment for practicing the embodiments herein is depicted in FIG. 4. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a RAM 14, ROM 16, and an I/O adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The embodiments herein allow a user to calculate the orientation of a spin or measurement axis. The embodiments herein determine attitude information from a GPS receiver on a spinning body, although many more applications are possible. Furthermore, the embodiments herein can be applied with light, sound, or other types of energy to determine the attitude of a spin axis. Moreover, the embodiments herein could be used, for example, to instrument a range using light or electromagnetic energy. In another application, the attitude of a motor or drill shaft or spacecraft could be determined using the embodiments herein.

The embodiments herein generate a set of equations to be solved using nonlinear least squares. If a spin axis with one end is located at a known location, the orientation or location of the other end is calculated. Next, a vector orthogonal to and rotating about the spin axis is determined. This vector represents a sensor or measurement device and may be referred to as the "sensing vector". Assuming there are two known locations or energy sources, as the sensing vector rotates there is a point of rotation where one of the locations becomes visible or is in the plane of the sensing vector and spin axis. The sensing vector rotates until this becomes true of the other location. The rotational distance between these instances is considered to be the "observation". The cosine of the observation is the inner product of the sensing vector's orientation (normalized) as each location becomes visible. The sensing vector at the instant of the observation can be described in terms of the known direction (with respect to the known location) and the spin axis. This allows the generation of an equation that includes variables representing the orientation of the spin axis. In this example, there are three variables used to define orientation, thus three separate equations are provided. It follows that four known locations are utilized. These equations can be used in a nonlinear least squares technique to calculate the orientation of the spin axis to a desired accuracy. Once the spin axis is determined the roll angle can easily be determined based on location crossings and spin information.

The embodiments herein can be used with GPS to solve for the attitude of a spinning round. This could be implemented with a two antenna system, for example. Generally, with GPS it is difficult to quickly lock onto a satellite. By using a ring antenna and a directional antenna the problem can be solved. It is assumed that the ring antenna has been used by the receiver to establish lock. Lock is the knowledge of the receiver's location in the frequency, time-delay space. Using the lock information the directional antenna is queried as to the presence of a specific satellite. After a satellite has been detected the amount of roll until a subsequent satellite becomes visible is recorded as the observation.

Range systems with beacons at known locations being used as known directions may be considered in accordance with the embodiments herein. Lasers, infrared, and other portions of the electromagnetic spectrum can be used as energy sources as well. Additionally, stars could make reliable energy sources. Sound waves and pressure waves of various types can be used as long as the direction to the energy source is known. The ability to monitor the precise attitude of a spinning shaft has uses in commercial applications as well as military applications.

The embodiments herein can be used on test ranges to find the attitude of a body. By using energy sources at known locations and proper receivers the method can be applied to find a body's orientation. Using phased array antennas it would be possible to use the method in non-spinning environments. The embodiments may be implemented with any external transmission source, which, for example, could be terrestrial, spaceborne, or airborne. Additionally, the embodiments herein could be implemented with most current navigation systems (Loran, Navy-omega, GPS, GLONASS) and could be implemented at other wavelengths (for example, acoustic).

Appendix

```
function [dip, num]=ipiter(a,meas)
%for i=1:n a(:,i)=a(:,i)/norm(a(:,i)); end
aipa'*a; %inner products
[m n]=size(a);
%sweep the spin axis component from the other vectors
sa=a;
for i=2:n
    sa(:,i)=a(:,i)-aip(1,i)*a(:,1);
end
anorm=sqrt(sum(sa.^2)); %norm of the vectors orth to spin axis
%get the measurements c notes
num=anorm;
for i=2:n-1
    num(i)=(aip(i,i+1)-aip(1,i)*aip(1,i+1))/(anorm(i)*anorm(i+1));
end
%c the angular situation
%acos(num)*180/pi;
% find differential
dip=zeros(n-2,3); %initialize
```

-continued

Appendix

```
for j=2:n-1
    denom=anorm(j)*anorm(j+1);
    for i=1:3
        dip(j-1,i)=-(a(i,j)*aip(1,j+1)+a(i,j+1)*aip(1,j))/denom;
    end
end
routine ipconverge
tst=astart(:,1)';
%a(:,1)=[-.2;-.9;.0001];
it=0;
[r n_ipc]=size(meas);
n_ipc=n_ipc-1;
while (1-abs(tst*a(:,1))>.000001
%for i=1:20
    it=it+1;
    [dip num]=ipiter(a,meas);
    y=(meas(2:n_ipc)-num(2:n_ipc)0';
    xtx=inv(dip'*dip);
    yadj=xtx*dip'*y;
    a(:,1)=a(:,1)+yadj;
    a(:,1)=a(:,1 )/norm(a(:,1));
    if it>100 break; end
end
%function y=gpsipsim( )
close all;
clear all;
% ------------------------------------------------------------
% --- Read ephemeris (RINEX nav-file or YUMA almanac)    ---
% --- and delete double occurences of SVN's              ---
%
eph = sortrows(rdyuma('yuma79.txt'));
% ------------------------------------------------------------
% --- Station coordinates (WGS84 / XYZ) ---
% ----------------------------------------
station(1) = 3923625; % Delft (Geodesy-building)
station(2) = 298462;
station(3) = 5002803;
cutoff     = 10;     % Cutoff elevation in degrees
% -----------------
% --- Time/span ---
% -----------------
tsat = mktsat ('28-FEB-2001 12:00:00','28-FEB-2001 14:00:00',300);
% --------------------------------------------------------
% --- Compute satellite positions (XYZ WGS84 & AZ/EL) ---
% --------------------------------------------------------
[xsat,ysat,zsat,azim,elev,rotmat]  = cpaziele (tsat,eph,station);
%get local directions form the rotation matrix
local_vert=-rotmat(3,:)';
local_north=rotmat(1,:)';
%pick a random angle to rotate about the local vert
%make a quaternion rotation about the vert
%find the new axis by rotating local north about the vert
d_r=2*pi*rand;
q_d=q_aa2quat(local_vert,d_r);
axis=q_rotate(q_d,local_north);
%follow above procedure choose rotation
%make rotation quat to rotate about previous horizantal axis
%calculate new axis by rotaing the verticle axis
d_r=45*pi/180;
q_d=q_aa2quat(axis,d_r);
s_axis=q_rotate(q_d,local_vert);
a=zeros(3,29);
[r n_epochs]=size(tsat);
con_its=[ ];
est_err=[ ];
dxtx=[ ];
itlist=[ ];
i_noncon=0;
for i=1:n_epochs
    vis_sat =  find (elev(:,i) > cutoff);
    n_direct=size(vis_sat);
    for j=1:size(vis_sat)
        tmp=[xsat(vis_sat(j),i);ysat(vis_sat(j),i);zsat(vis_sat(j),i)];
        tmp=tmp-station';
        tmp=tmp/norm(tmp);
        a(:,j)=tmp;
    end
```

-continued

Appendix

```
    a=[s_axis a];
    n=n_direct+1;
    a=a(:,1:n);
    aip=a'*a;
    sa=a;
    for i=2:n
        sa(:,i)=a(:,i)-aip(1,i)*a(:,1);
    end
    anorm=sqrt(sum(sa.^2));
    num=a(1,:);
    aip=a'*a;
    for i=2:n_direct
        num(i)=(aip(i,i+1)-aip(1,i)*aip(1,i+1))/(anorm(i)*anorm(i+1));
    end
    meas=num;
    astart=a;
    d_r=2*pi*rand;
    q_d=q_aa2quat(s_axis,d_r);
    axis3=q_rotate(q_d,axis);
    d_r=10/180*pi;
    q_d=q_aa2quat(axis3,d_r);
    axis_p=q_rotate(q_d,s_axis);
    a(:,1)=axis_p;
    ipconverge
    con_its=[con_its it];
    err=astart(:,1)-a(:,1);
    est_err=[est_err err];
    dxtx=[dxtx det(xtx)];
    if it>100
        i_noncon=i_noncon+1;
        noncon(i_noncon).a=astart;
        noncon(i_noncon).sa=axis_p;
        noncon(i_noncon).meas=meas;
        i
        xtx
        anorm
        aip
        a
    end
end
example of use
gpsipsim
ipinvest
a=noncon.a
ipinvest
plot_hs
a=noncon.a
r_set
plot_hs
con_its
gpsipsim
con_its
help find
find(con_its>100)
noncon
size(noncon)
nonconinv
plot_hs
pplot_hs
plot_hs
noncon
r_noncon=noncon
con_its
rotatenocon
rotatnocon
rotatnoncon
noncontemp=noncon
noncon=r_noncon;
nonconinv
plot_hs
%function y=ipadjust( )
n=5; %n must b more than 3
a=randn(3,n);
for i=1:n a(:,i)=a(:,i)/norrn(a(:,i)); end
aip=a'*a %inner products
%sweep the spin axis component from the other vectors
sa=a;
```

Appendix (continued)

```
for i=2:n
  sa(:,i)=a(:,i)-aip(1,i)*a(:,1);
end
anorm=sqrt(sum(sa.^2)); %norm of the vectors orth to spin axis
%get the measurements c notes
num=anorm;
for i=2:n-1
  num(i)=(aip(i,i+1 )-aip(1,i)*aip(1,i+1))/(anorm(i)*anorm(i+1));
end
%c the angular situation
acos(num)*180/pi
% find differential
dip=zeros(n-2,3); %initialize
for j=2:n-1
  denom=anorm(j)*anorm(j+1);
  for i=1:3
    dip(j-1,i)=-(a(i,j)*aip(1,j+1)+a(i,j+1)*aip(1,j))/denom;
  end
end
%function y=ipconverge_d(d,rotaxis)
d_r=d/180*pi
q_d=q_aa2quat(rotaxis,d_r)
axis=q_rotate(q_d,v)
a(:,1)=axis
ipconverge
y=it
%function y=ipinvest(a)
aip=a'*a %inner products
%sweep the spin axis component from the other vectors
sa=a;
[r n]=size(a);
for i=2:n
  sa(:,i)=a(:,i)-aip(1,i)*a(:,1);
end
anorm=sqrt(sum(sa.^2)); %norm of the vectors orth to spin axis
%get the measurements c notes
num=anorm;
for i=2:n-1
  num(i)=(aip(i,i+1 )-aip(1,i)*aip(1,i+1))/(anorm(i)*anorm(i+1));
end
astart=a;
meas=num;
tst=astart(:,1)';
a(:,1)=starta
%
it=0;
[r n_ipc]=size(meas);
n_ipc=n_ipc-1;
seq=[ ];
while (1-abs(tst*a(:,1)))>.000001
%for i=1:20
  it=it+1;
  [dip num]=ipiter(a,meas);
  y=(meas(2:n_ipc)-num(2:n_ipc))';
  xtx=inv(dip'*dip);
  yadj=xtx*dip'*y;
  %af=yadj-yadj'*a(:,1)*a(:,1); this method oscilated too much
  %yadj_1=norm(yadj)*af/norm(af);
  temp=a(:,1)+yadj; %method2
  temp=temp/norm(temp); %m2
  t_2=temp-a(:,1); %m2
  t_2=norm(yadj)/norm(t_2)*t_2; %m2
  a(:,1)=a(:,1)1*t_2; %m2
  a(:,1)=a(:,1)/norm(a(:,1)); %m2
  %a(:,1)=temp/norm(temp); %method 1
  seq=[seq a(:,1)];
  if it>100 break; end
end
figure;plot3(seq(1,:),seq(2,:),seq(3,:),'-+')
grid on;
hold on;plot3(astart(1,1),astart(2,1),astart(3,1),'ro')
plot3(seq(1,1),seq(2,1),seq(3,1),'go')
%this was to plot eigenvalues from [d v]=eig(xtx)
%x=astart(:,1);for iz=1:3 plot3([x(1) x(1)+.02*v(1,iz)],[x(2) x(2)+
.02*v(2,iz)], [x(3)
x(3).02*v(3,iz)]); end
%function y=ipstart( )
ipadjust
astart=a;
meas=num
v=astart(:,1)
vperp=[v(2);-v(1);0]
deg=2*pi*rand
pertaxis=q_aa2quat(v,deg)
rotaxis=q_rotate(pertaxis,vperp)
d5=5/180*pi
q5=q_aa2quat(rotaxis,d5)
axis_5=q_rotate(q5,v)
a(:,1)=axis_5
ipconverge
d10=10/180*pi
q10=q_aa2quat(rotaxis,d10)
axis_10=q_rotate(q10,v)
a(:,1)=axis_10
ipconverge
%function y=iptest( )
n=3; %n must b more than 3
a=randn(3,n);
for i=1:n a(:,i)=a(:,i)/norm(a(:,i)); end
a;
a2=a.^2;
sum(a2)
aip=a'*a
ip1=aip(1,3);
ip2=aip(2,3);
sa1=a(:,1)-ip1*a(:,3);
sa1'*a(:,3)
s_ip=sa1'*sa2/(norm(sa1)*norm(sa2));
acos(s_ip)*180/pi
acos(aip(1,2))*180/pi
sa2'*a(:,3)
ns1=norm(sa1);
ns2=norm(sa2);
num=aip(1,2)-aip(1,3)*aip(2,3);
acos(num/(ns1*ns2))*180/pi
% find differential
dip=sa1;
for i=1:3
  dip(i)=-(a(i,1)*aip(2,3)+a(i,2)*aip(1,3));
end
dip=dip/(ns1*ns2)
%function y=nonconinv( )
[r c]=size(noncon);
for i=1:c
  a=noncon(i).a
  starta=noncon(i).sa
  ipinvest
end
%function y=plot_hs( )
n=20
theta = pi*(-n:2:n)/n;
phi = (pi/2)*(0:2:n)'/n;
X = cos(phi)*cos(theta);
Y = cos(phi)*sin(theta);
Z = sin(phi)*ones(size(theta));
%figure
plot3(X,Y,Z,'y')
[r,c]=size(Z);
hold on
for i=1:r
  plot3(X(i,:),Y(i,:),Z(i,:),'y')
end
%function y=r_set( )
q1=q_aa2quat([1;1;0],pi/4)
ar=a;for j=1:9 ar(:,j)=q_rotate(q1,a(:,j)); end
a=ar
ipinvest
%function y=rotatnoncon( )
r_noncon=noncon;
q1=q_aa2quat([1;1;0],pi/4); %rotational axis and angular rotation
[r c]=size(noncon);
```

-continued

Appendix

```
for i=1:c
    ar=noncon(i).a;for j=1:9 ar(:,j)=q_rotate(q1,a(:,j)); end
    r_noncon(i).a=ar;
    r_noncon(i).sa=q_rotate(q1,noncon(i).sa);
end
```

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of determining an orientation of a spinning object at a known global positioning system (GPS) location, said method comprising:

radially deploying antennae around a plurality of axes of measurement of said spinning object;

determining a spin axis of a first end of said spinning object;

determining a sensing vector orthogonal to said spin axis;

identifying at least two known GPS locations corresponding to said spinning object; and rotating said sensing vector about said spin axis until two of the known GPS locations become visible or are in the plane of said sensing vector and said spin axis, wherein a first point of rotation of said sensing vector exists when a first known GPS location becomes visible or is in said plane of said sensing vector and said spin axis, and wherein a second point of rotation of said sensing vector exists when a second known GPS location becomes visible or is in said plane of said sensing vector and said spin axis;

calculating a rotational distance between said first point of rotation of said sensing vector and said second point of rotation of said sensing vector;

calculating a roll angle corresponding to said spinning object in relation to a first plane of said GPS location by normalizing said sensing vector at said first point of rotation of said sensing vector and said second point of rotation of said sensing vector;

repeating calculating a roll angle for multiple planes of said GPS location; and combining the roll angles calculated thereby to produce said orientation of said spinning object.

2. The method of claim 1, wherein said measuring process occurs using a frequency domain correlation.

3. The method of claim 1, further comprising corresponding energy sources to said known GPS location.

4. A program storage device readable by computer, tangibly embodying a program of instructions executable by said computer to perform a method of determining an orientation of a spinning object at a known global positioning system (GPS) location, said method comprising:

radially deploying antennae around a plurality of axes of measurement of said spinning object;

determining a spin axis of a first end of said spinning object;

determining a sensing vector orthogonal to said spin axis;

identifying at least two known GPS locations corresponding to said spinning object; and rotating said sensing vector about said spin axis until two of the known GPS locations become visible or are in the plane of said sensing vector and said spin axis, wherein a first point of rotation of said sensing vector exists when a first known GPS location becomes visible or is in said plane of said sensing vector and said spin axis, and wherein a second point of rotation of said sensing vector exists when a second known GPS location becomes visible or is in said plane of said sensing vector and said spin axis;

calculating a rotational distance between said first point of rotation of said sensing vector and said second point of rotation of said sensing vector;

calculating a roll angle corresponding to said spinning object in relation to a first plane of said GPS location by normalizing said sensing vector at said first point of rotation of said sensing vector and said second point of rotation of said sensing vector;

repeating calculating a roll angle for multiple planes of said GPS location; and combining the roll angles calculated thereby to produce said orientation of said spinning object.

5. The program storage device of claim 4, wherein said measuring process occurs using a frequency domain correlation.

6. The program storage device of claim 4, wherein said method further comprises corresponding energy sources to said known GPS location.

7. A system for determining an orientation of a spinning object at a known global positioning system (GPS) location, said system comprising:

antennae radially deployed around a plurality of axes of measurement of said spinning object;

a transceiver on said spinning object and adapted to transmit wireless signals from said spinning object;

a receiver adapted to receive the transmitted wireless signals from said transceiver; and a logic component in communication with said receiver and adapted to:

determine a spin axis of a first end of said spinning object;

determine a sensing vector orthogonal to said spin axis;

identify at least two known GPS locations corresponding to said spinning object; and rotate said sensing vector about said spin axis until two of the known GPS locations become visible or are in the plane of said sensing vector and said spin axis, wherein a first point of rotation of said sensing vector exists when a first known GPS location becomes visible or is in said plane of said sensing vector and said spin axis, and wherein a second point of rotation of said sensing vector exists when a second known GPS location becomes visible or is in said plane of said sensing vector and said spin axis;

calculate a rotational distance between said first point of rotation of said sensing vector and said second point of rotation of said sensing vector;

calculate a roll angle corresponding to said spinning object in relation to a first plane of said GPS location by normalizing said sensing vector at said first point of rotation of said sensing vector and said second point of rotation of said sensing vector;

repeat calculation of roll angle for multiple planes of said GPS location; and generate said orientation of said spinning object by combining all roll angle calculations.

8. The system of claim 7, wherein the measurement of said roll angles occurs using a frequency domain correlation.

9. The system of claim 7, wherein said known GPS location corresponds with energy sources directed towards said spinning object.

* * * * *